United States Patent
Koshkin (10) Patent No.: US 9,335,608 B2
(45) Date of Patent: May 10, 2016

(54) FILTER HOLDER AND SUNSHADE FOR A CAMERA

(71) Applicant: Viktor Koshkin, Tallinn (EE)

(72) Inventor: Viktor Koshkin, Tallinn (EE)

( * ) Notice: Subject to any disclaimer, the term of this patent is extended or adjusted under 35 U.S.C. 154(b) by 0 days.

(21) Appl. No.: 14/382,411

(22) PCT Filed: Mar. 1, 2013

(86) PCT No.: PCT/EP2013/054226
§ 371 (c)(1),
(2) Date: Sep. 2, 2014

(87) PCT Pub. No.: WO2013/135508
PCT Pub. Date: Sep. 19, 2013

(65) Prior Publication Data
US 2015/0110483 A1      Apr. 23, 2015

(30) Foreign Application Priority Data
Mar. 1, 2012 (EP) .................................. 12157623

(51) Int. Cl.
| | |
|---|---|
| *G03B 11/04* | (2006.01) |
| *G03B 11/00* | (2006.01) |
| *G03B 17/12* | (2006.01) |
| *G03B 17/14* | (2006.01) |
| *G03B 17/56* | (2006.01) |

(52) U.S. Cl.
CPC .............. *G03B 11/045* (2013.01); *G03B 11/00* (2013.01); *G03B 17/12* (2013.01); *G03B 17/14* (2013.01); *G03B 17/565* (2013.01)

(58) Field of Classification Search
CPC ..... G03B 11/04; G03B 11/045; G03B 11/048
See application file for complete search history.

(56) References Cited

U.S. PATENT DOCUMENTS

| | | | | |
|---|---|---|---|---|
| 4,404,595 | A * | 9/1983 | Ushiro et al. .................. | 348/357 |
| 2005/0190461 | A1 * | 9/2005 | Petroff ........................... | 359/819 |
| 2007/0001050 | A1 * | 1/2007 | Taatjes et al. ............... | 242/598.6 |
| 2007/0268588 | A1 | 11/2007 | Elias et al. | |

FOREIGN PATENT DOCUMENTS

| | | |
|---|---|---|
| EP | 1847872 A1 | 10/2007 |
| JP | 9090469 A | 4/1997 |
| WO | 03058316 A1 | 7/2003 |

OTHER PUBLICATIONS

EP Search Report dated Aug. 3, 2012 of Patent Application No. EP12157623 filed Mar. 1, 2012.

* cited by examiner

*Primary Examiner* — Clayton E Laballe
*Assistant Examiner* — Noam Reisner
(74) *Attorney, Agent, or Firm* — Maine Cernota & Rardin (57) ABSTRACT

A camera accessory comprising a frame 34 having an opening for the lens, a filter holder rotatably attached to the frame, and at least one sunshade 6-8 attached to the frame, whereas the filter holder comprises a ring 13/14 with outer diameter matching the diameter of the frame opening, whereas the ring has an opening of a diameter sufficiently larger than the lens diameter to prevent the ring being visible in the frame when using the accessory, whereas the filter holder has a filter slot 15/16 attached to the ring on one side of the frame, and a lens ring attachment element 14 attached to the ring on the other side of the frame, whereas the frame and sunshade are rotatable around the longitudinal axis of the lens independent of rotating the filter holder around the longitudinal axis of the lens.

10 Claims, 8 Drawing Sheets

FILTER HOLDER AND SUNSHADE FOR A CAMERA

RELATED APPLICATIONS

This application is a national phase application of PCT Application No. PCT/EP2013/054226 filed on Mar. 1, 2013, which claims priority from European Application No. EP12157623.5 filed Mar. 1, 2012. Each of these applications is herein incorporated by reference in their entirety for all purposes.

TECHNICAL FIELD

The invention relates to camera accessories used in photography and cinematography, in particular to filter holders-sunshades attached to the lens of a camera, camcorder or cine camera.

BACKGROUND ART

Different filters are used in photography and cinematography for photographing or filming in specific lighting conditions. Protective and UV filters, polarising filters, filters correcting colour balance, filters absorbing a particular colour, contrast enhancing filters, infrared filters, neutral grey filters and filters required to achieve various effects can be distinguished. Filters are either round or square. Round filters consist of the filter itself and a filter collar that is threaded for attachment to front of the lens. A filter suited for this particular diameter has to be obtained for each lens diameter. Square filters consist of a filter holder and the filter itself. Every lens diameter requires a filter holder suited for this particular diameter but filters itself can be purchased in one size independent of the lens diameter.

Sometimes two or more filters have to be used simultaneously. Filter package holders containing two or more filter holders stacked together and comprising a pair of parallel slots pointed towards each other, whereas one round filter can be installed in each pair of slots, are known (e.g. GB2097546, Attachment of filters to a camera lens). The filters can be slid forwards and backwards in the slot, which is particularly useful when using filters with properties varying between the edges, e.g. filters of variable darkness or colour. In addition to using several filters at the same time rotating of filters is also necessary. Only round filters can be rotated in case of the known solution; the solution does not enable rotation and usage of square filters.

Additionally, using suitable sunshades is also required to prevent the lens from being exposed to direct sunlight. Usually at least an upper sunshade and one or two lateral sunshades have to be used, whereas the position of the lateral sunshades has to be extremely adjustable first of all, to prevent the lateral sunshades from getting in the frame, primarily in case of wide-angle shots. Adjusting the position of the lateral sunshades and the upper sunshade has to be simple and convenient. Maintaining the position of the lateral sunshades and upper sunshade in relation to light sources or the workplane has to be possible when rotating the filters and/or camera.

Also known is WO03/058316, disclosing an optical filters quick assembly support system for a motion picture or professional video cameras, comprising a mount base ring, one or more filter holders, rotatable relative to the mount base ring, and a sunshade. While this solution allows to use multiple filters and rotate such filters relative to each other, the sunshade cannot be rotated relative to the mount base, and the mount base cannot be rotated relative to the objective as the mount base is fixed to the camera body.

Thus, a device enabling rotation of square filters in relation to the lens, enabling rotating the sunshades in relation to the lens, and enabling to rotate square filters relative to the sunshades is required. Such device should be preferably equipped with an upper sunshade and lateral sunshades that are easily adjustable to adequate extent, including using for taking wide-angle shots; easily attached to and detached from the camera, and with filters located as close to the lens as possible.

DISCLOSURE OF INVENTION

To achieve these and further objectives the camera accessory of this invention comprises a frame with a round opening in the centre, a rotatable filter holder attached to the frame opening, and at least one position-adjustable sunshade attached to the frame, whereas the filter holder and the sunshade can be rotatably adjusted around the longitudinal axis of the lens independently from each other. Preferably the device is attached to the lens using a standard lens ring (the so-called Cokin ring).

The rotatable filter holder includes a ring rotatably attached to the round opening of the frame. For this the ring and opening are equipped with a mutually matching groove and extension (e.g. the groove on the ring and the extension on the opening or the other way round), whereas sliding of the extension in the groove enables the ring to be rotated in relation to the frame. To prevent unwanted turning of the filter slot in relation to the frame, the frame or ring could be additionally equipped with a fixing element that enables the ring to be freely rotated in one position, and fixes the position of the ring in relation to the frame in another position.

To bring the filter holder and the filters as close as possible to the lens, and to minimise the weight of the frame and the ring while maintaining sufficient strength and rigidity, the frame and the ring are made as thin as possible, with a thickness of 1 mm to 1 cm, preferably 2-7 mm, most preferably 3-5 mm.

The accessory is preferably equipped with an upper sunshade and two lateral sunshades. The upper sunshade is attached to the frame by its shorter side at the upper part of the frame so the upper sunshade is rotatable around an axis parallel to the longitudinal axis of the frame, with the purpose of adjusting the position of the upper sunshade. The lateral sunshades are also essentially flat and preferably rectangular-shaped or trapezoid-shaped, and rotatable around an axis crosswise to the longitudinal axis of the frame. The sunshades could also be slightly convex, concave or otherwise bent to achieve better matching with each other or the frame. The fastening of the lateral and upper sunshades is preferably solved in a way that enables using the same fastening for adjusting both the positions of the lateral sunshade and the upper sunshade together. A bolt screwed in a threaded opening running along the longitudinal axis of the frame, and having a head sufficiently large to enable turning could be used for this. A clamped hinge integrated with the fastening of the upper sunshade is used to attach the lateral sunshade to the frame. The clamped hinge is formed by a rod or tube attached to the edge of the lateral sunshade, enclosed in an attachment sheath enabling tightening, rolled from suitable sheet metal, with both ends brought together, and comprising an opening for the attachment bolt of the upper sunshade. When the attachment bolt is tightened the upper sunshade and the attachment sheath of the lateral sunshade are clamped together, preventing moving of the upper sunshade and the lateral sunshade either by friction force or by fixing in suitable discrete positions. The friction force decreases when loosening the attachment bolt, and the upper and lateral sunshades can be moved to the desired positions.

MODE(S) FOR CARRYING OUT THE INVENTION

Figure 10A:
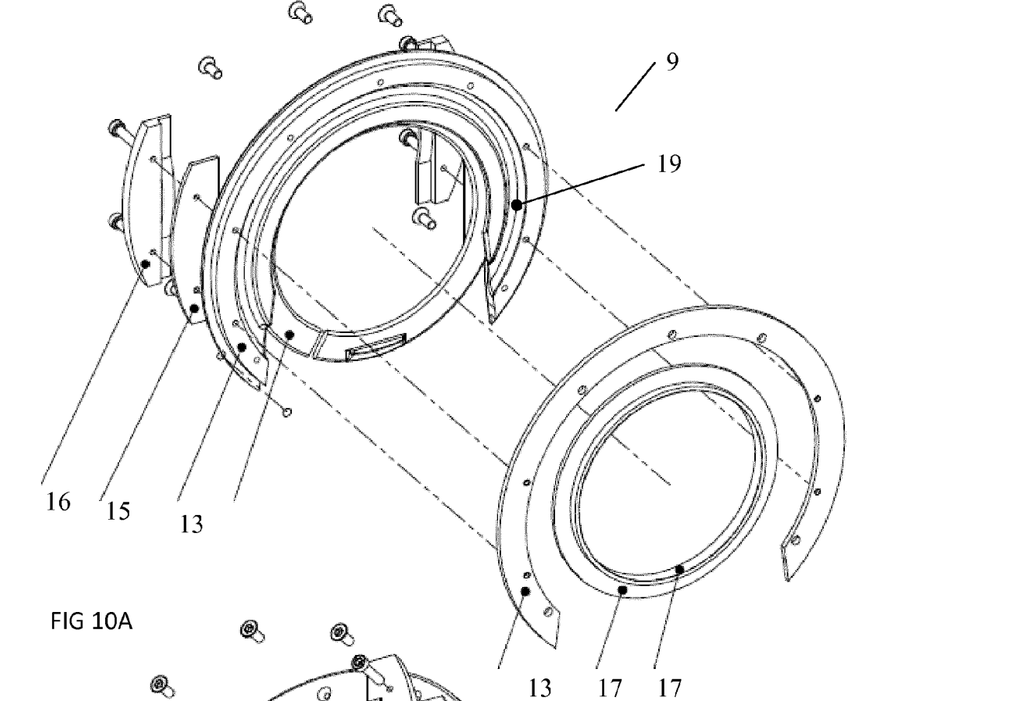
FIGS. 10A and B depict axonometric projections of the filter holder from one and the other side of the filter holder.
Figure 10B:
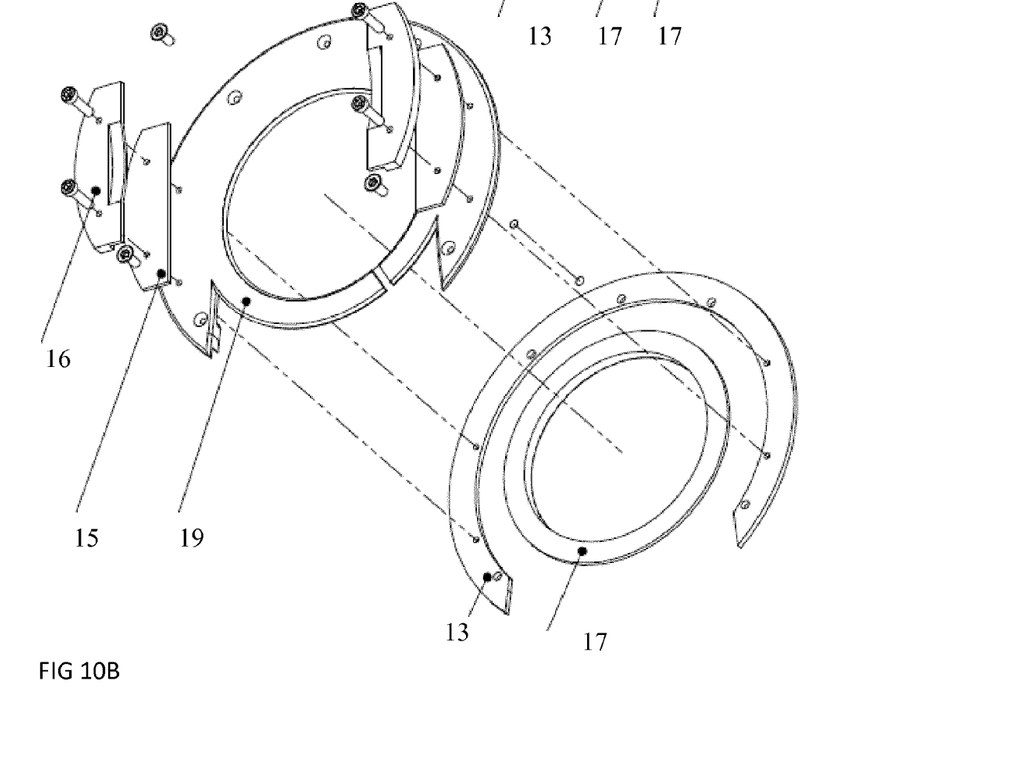

One example of the invention is depicted on FIG. 1 to FIG. 5. The camera accessory 1 comprises a frame 2 with a round opening 3 in the centre, having a rotatable filter holder 4 (see FIGS. 10A and 10B) with the purpose of holding at least one square filter 5 (see FIG. 1) in front of the lens, and at least one position-adjustable sunshade (on the figures the upper sunshade 6 and lateral sunshades 7 and 8) attached to it.

The rotatable filter holder 4 comprises a filter holder ring 9 with outer diameter matched to the diameter of the frame opening, and rotatably attached to the round opening 3 of the frame 2. For that purpose the ring 9 and opening 3 are equipped with a mutually matching groove 10 and extension 11 (e.g. the groove on the ring and the extension on the opening, see FIG. 3C and FIGS. 10A and 10B, or the other way round), whereas sliding of the extension 11 in the groove 10 enables the ring 9 to be turned in relation to the frame 2. The ring 9 has an opening 12 with a diameter matching the lens diameter, being sufficiently larger than it to prevent the ring 9 from being visible in the frame.

The filter holder 4 has at least one filter slot for holding at least one square filter 5 attached to the ring on one side of the frame 2, and a lens ring attachment element 14 attached to the ring on the other side of the frame 2 for attaching the filter holder to the lens.

To bring the filter holder together with the filters as close as possible to the lens, the frame and the ring are made as thin as possible, from 1 mm to 1 cm, preferably 2-7 mm, most preferably 3-5 mm.

The filter slot comprises a pair of rails formed by distance plates 15 whose purpose is to ensure suitable distance between the filter 5 and the ring, and spring plates 16 whose purpose is to keep the filter 5 in its place by friction force while enabling the filter to be moved forwards and backwards. This is particularly necessary when using filters with properties (e.g. darkness, colour) varying between the edges of the filter.

According to the preferred embodiment the accessory is attached to the lens either with a standard lens ring 17 or a suitable adapter ring. A standard lens ring 17 (also called Cokin ring) is a cylindrical item with one end equipped with a male thread. The lens is typically equipped with a female thread, and therefore the lens ring can be screwed on the lens. The other end of the lens ring 17 has a retreating flange for attaching the lens ring to various devices. The adapter ring enables attaching accessories with a larger diameter to a lens of a particular diameter.

For the purpose of attaching the accessory using either the standard lens ring 17 or an adapter ring the ring 9 has a lens ring attachment element on the side pointed towards the lens. The attachment element could be a so-called pocket comprising a flange with its first edge following the edge of the opening 12 of the filter holder ring 9, and its second edge attached to the filter holder ring, and the first edge projects towards the edge of the filter holder ring opening, leaving a gap 18 approximately equal to the thickness of the lens ring 17, whereas the flange extends around the opening by 120 to 200 degrees, preferably by ca 180 degrees, leaving the pocket open from one side to enable insertion of the lens ring. The section not covered by the flange enables insertion of the lens ring 17 into the pocket.

For the purpose of keeping the ring in the pocket the ring has a stop representing the detail 19 projecting from the ring 9. The ring 9 is dimensioned so, and manufactured of a material that is sufficiently rigid and sufficiently flexible that when inserting the lens ring 17 in the pocket the ring 9 bends away from the lens ring due to the pressure applied, enabling the lens ring to be pushed into the pocket, but removing the pressure causes the ring to restore its original position, and fix the lens ring 17 in the pocket with the stop 19.

Figure 9A:
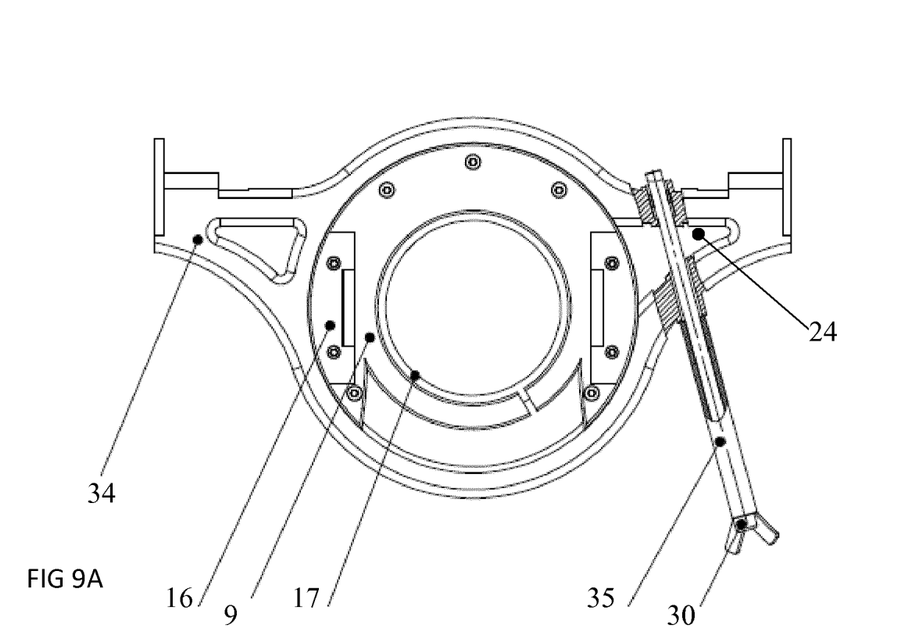
FIG. 9A depicts one solution for adjusting the frame opening.
Figure 9B:
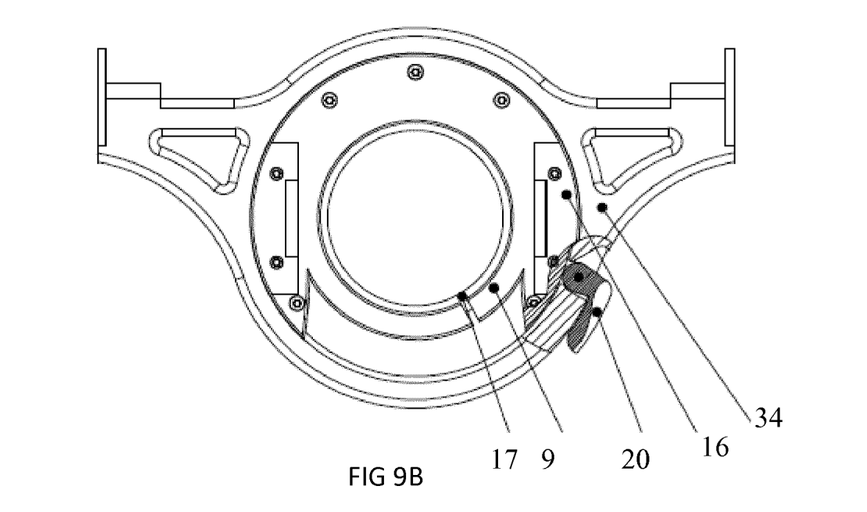
FIG. 9B depicts another solution.

To prevent unwanted turning of the filter holder 4 in relation to the frame 2, the frame or ring could be additionally equipped with a fixing element that enables the ring to be freely rotated in one position, and fixes the position of the ring in relation to the frame in another position. The fixing element could be either a restraining element enabling any position of the ring to be fixed in relation to the frame by using friction force (see FIG. 9B, eccentric 20) or a discrete fixing element enabling the ring to be fixed in certain pre-determined positions. The fixing element could be, e.g. a screw extending through the frame against the ring, a spring pin, eccentric or another element that enables moving against the ring and away from the ring. The fixing element could also be a contractible or clamped frame or frame section decreasing the diameter of the round frame opening or changes the shape of the round opening, e.g. making it slightly oval instead of round (see the screw 21 and slit 22 on FIG. 5, or the screw 30 and frame opening 24 on FIG. 9A).

The accessory is preferably equipped with sunshades, preferably with an upper sunshade 6 and two lateral sunshades 7 and 8. The upper sunshade 6 is an essentially flat trapezoid shaped element. The upper sunshade is attached to the frame 2 by the shorter base of the trapezium at the upper part of the frame so the upper sunshade is rotatable around an axis parallel to the longitudinal axis of the frame, with the purpose of adjusting the position of the upper sunshade. The lateral sunshades are also essentially flat and rectangular or trapezoid shaped, and are rotatable around an axis crosswise to the longitudinal axis of the frame. The fastening of the lateral and upper sunshades is preferably solved in a way enabling the same fastening to be used for adjusting both the positions of the lateral sunshade and the upper sunshade together.

Figure 1:
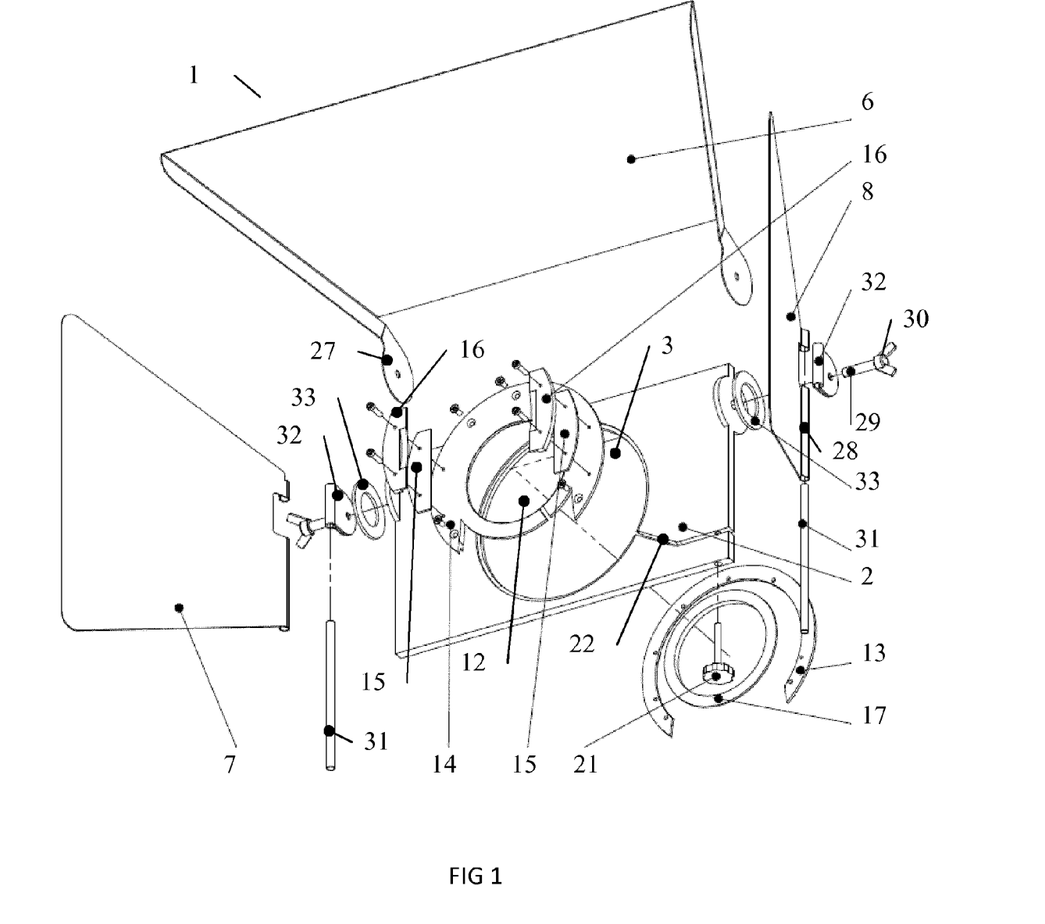
FIG. 1 depicts the expanded view of an embodiment of the invention.
Figure 2A:
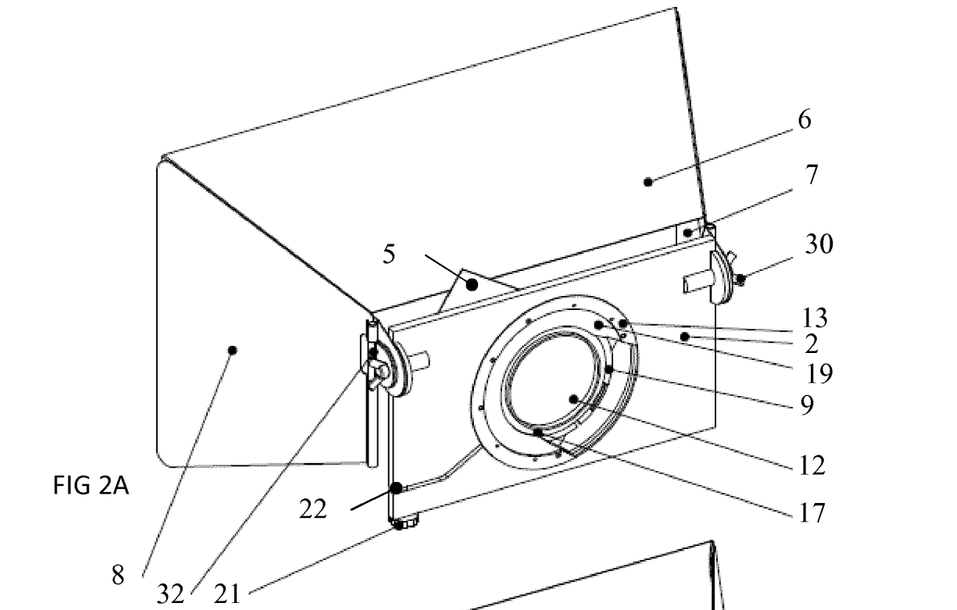
FIG. 2A depicts an axonometric projection (viewed from the direction of the camera) of the embodiment depicted on FIG. 1.
Figure 2B:
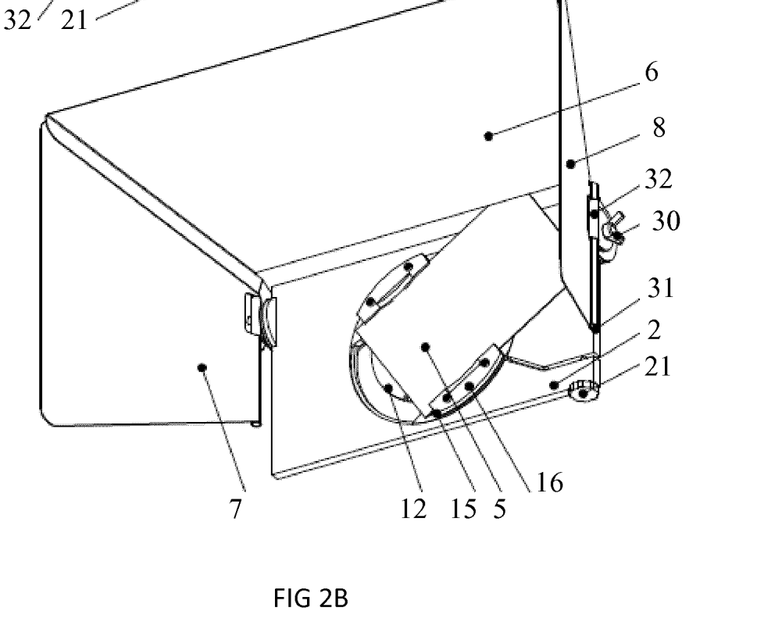
FIG. 2B depicts another axonometric projection (viewed in the direction of the camera) of the same embodiment.
Figures 3A, 3B, 3C:
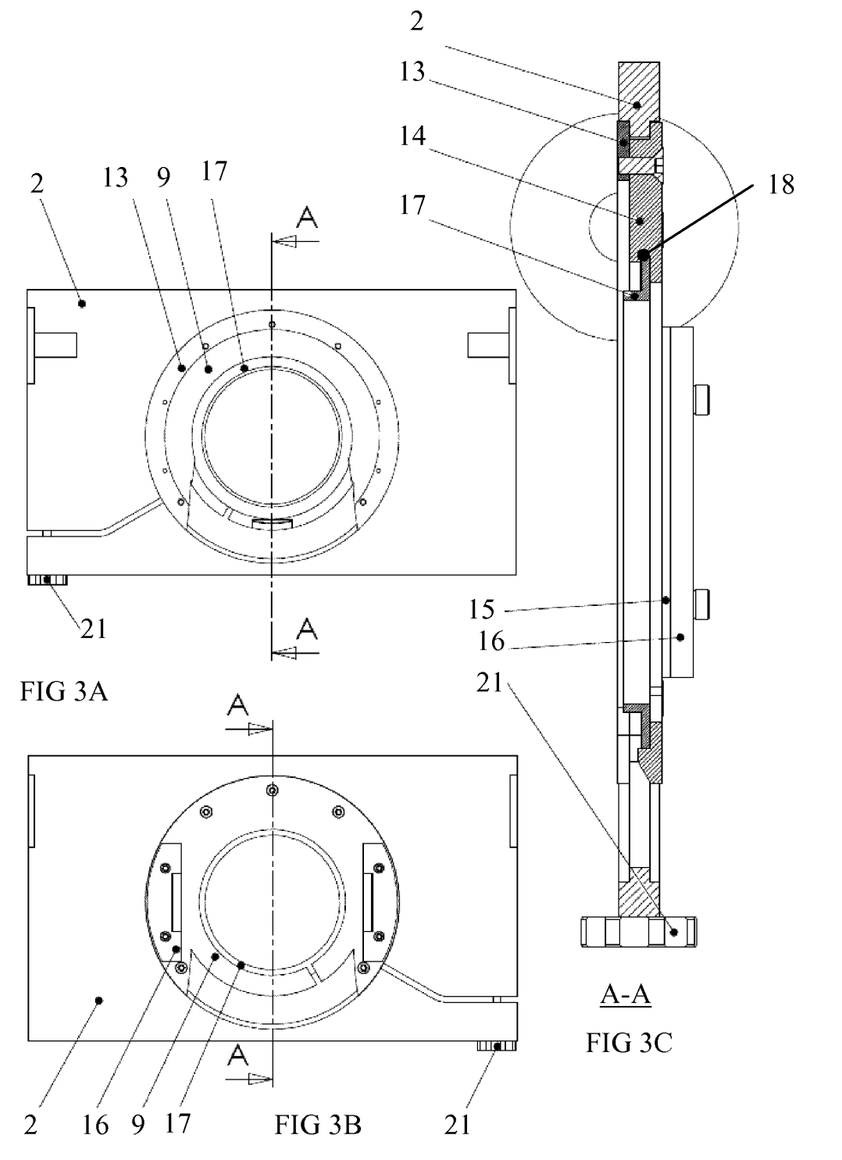
FIG. 3A depicts the front view (i.e. the view from the direction of the camera) of one embodiment of the frame and filter slot of the invention.
FIG. 3B depicts the rear view (i.e. the view in the direction of the camera) of the same embodiment of the frame.
FIG. 3C depicts section A-A of the frame.
Figure 4:
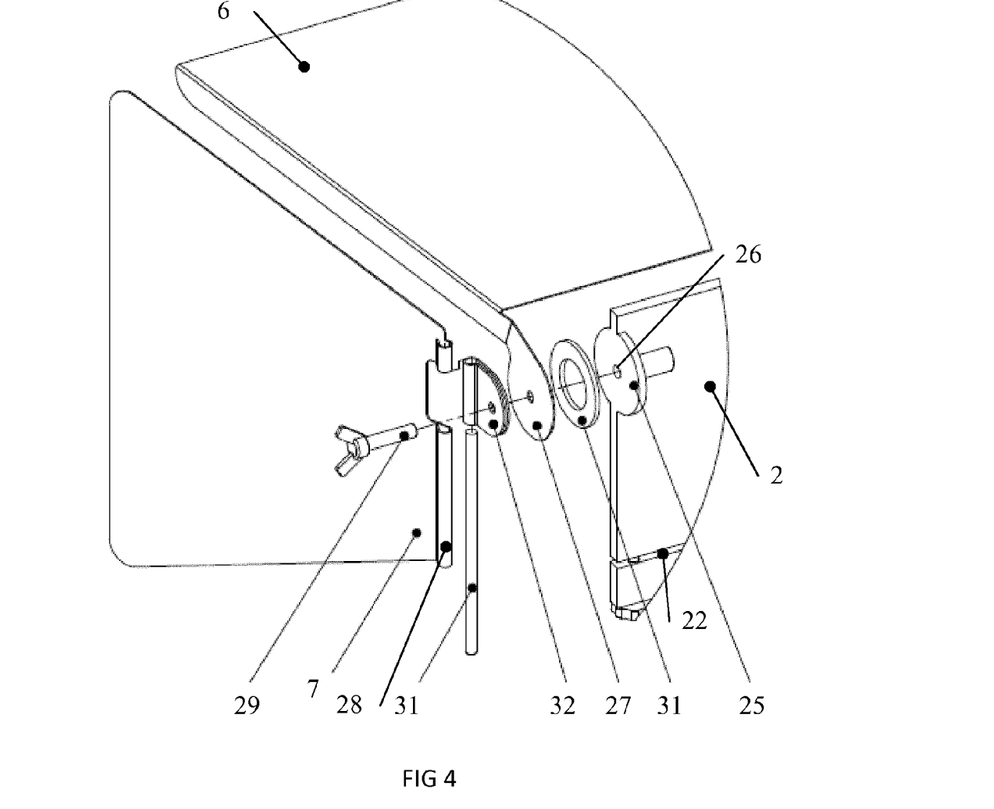
FIG. 4 depicts one solution for attaching the sunshades.
Figure 5:
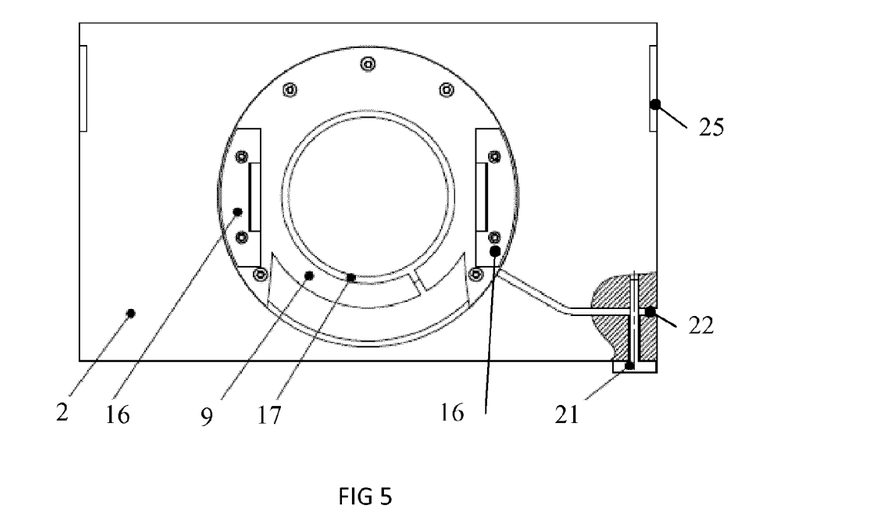
FIG. 5 depicts a solution for adjusting the frame opening in case of one embodiment.
Figure 6:
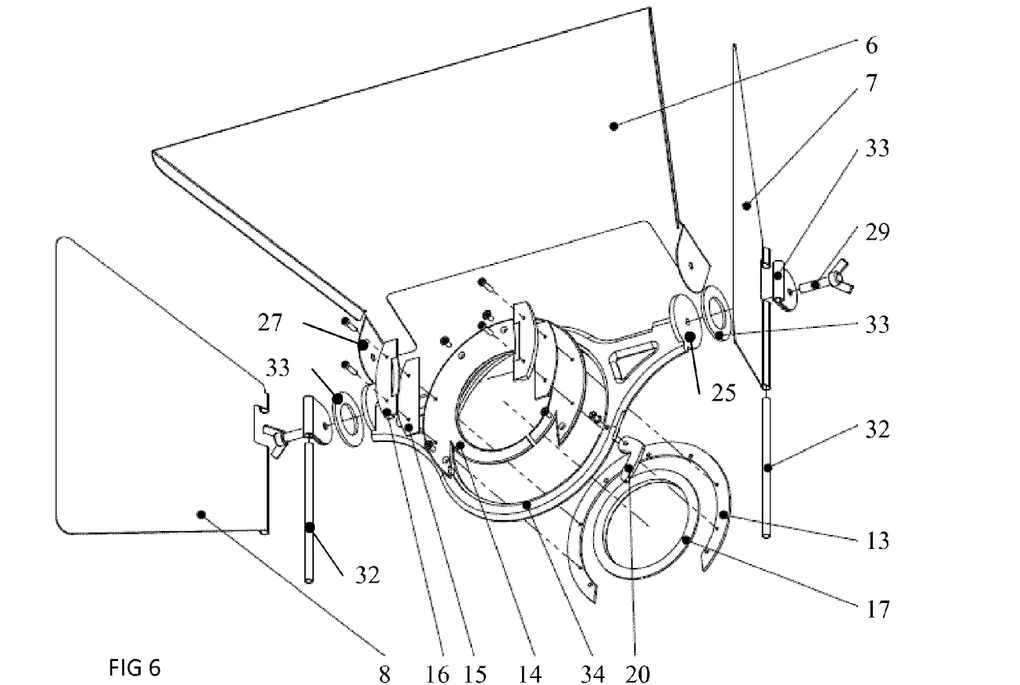
FIG. 6 contains the expanded view of another embodiment of the invention.
Figure 7:
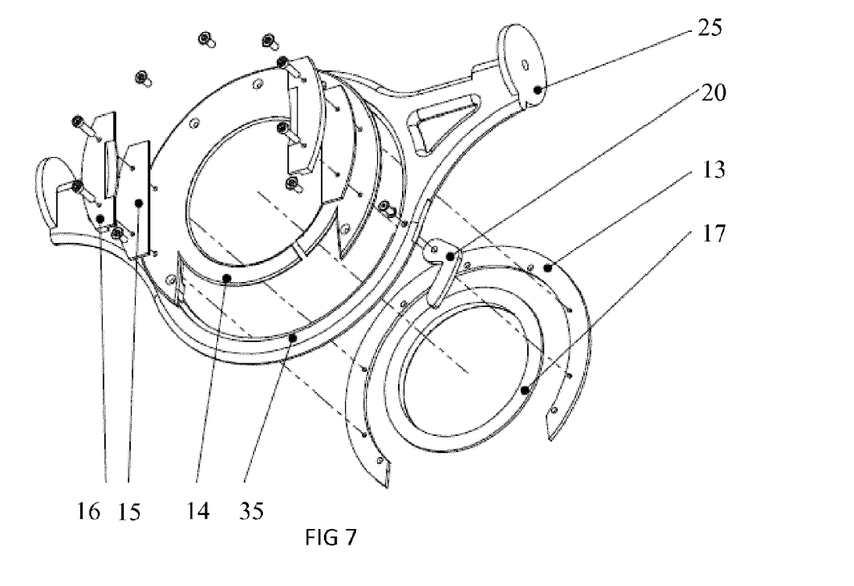
FIG. 7 depicts the same embodiment without the sunshades.
Figure 8A:
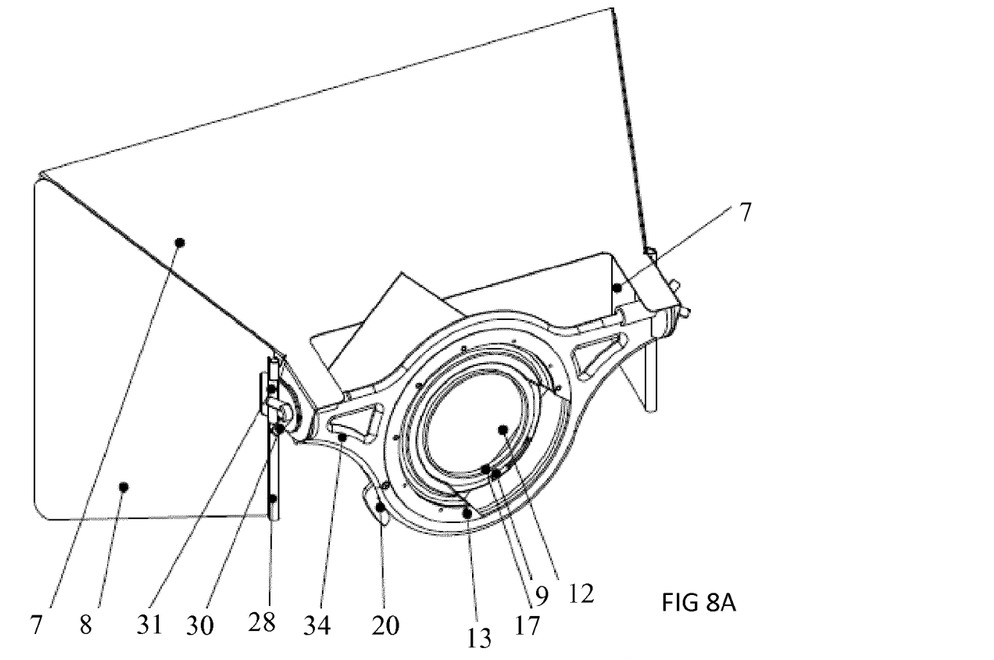
FIG. 8A depicts an axonometric projection (viewed from the direction of the camera) of the embodiment depicted on FIGS. 6 and 7.
Figure 8B:
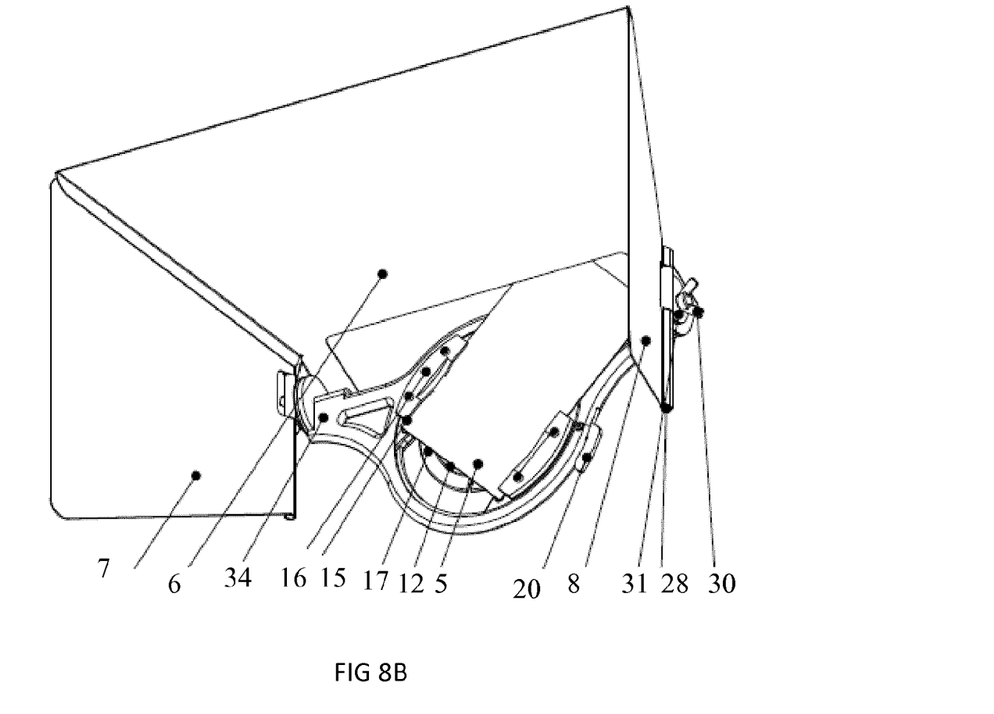
FIG. 8B depicts another axonometric projection (viewed in the direction of the camera) of the same embodiment.

An example of the attachment of the upper and lateral sunshades is shown on FIG. 4. The upper sunshade has the following attachment. An edging 25 is formed at the upper edge of the frame crosswise to the frame. A threaded opening 26 is present in the frame. The upper sunshade 6 has an attachment lug 27 comprising an opening. The upper sunshade 6 is attached to the frame with an attachment bolt 29. The attachment bolt 29 has a sufficiently large head 30 facilitating turning without auxiliary means, for example wing head. To fix the position of the upper sunshade 6 in the desired position in relation to the frame the bolt is tightened, clamping the attachment lug between the edging, and the head of the bolt.

The attachment of the lateral sunshade 7 is also integrated with the attachment of the upper sunshade. The lateral sunshade is attached by means of a clamped hinge attached to the edge 28 of the lateral sunshade, rolled into a tube, formed by a rod or tube 31 enclosed in an attachment sheath 32 bent from suitable sheet metal and enabling tightening, with both ends brought together, and comprising an opening for the attachment bolt of the upper sunshade. When tightening the attachment bolt 29 the lug 27 of the upper sunshade, and the attachment sheath 32 of the lateral sunshade are clamped together, preventing moving of the upper sunshade and lateral sunshade either by friction force or by fixing in suitable discrete positions. The friction force decreases when loosening the attachment bolt, and the upper and lateral sunshades can be moved to desired positions. The attachment bolt 29 could also include a washer 33.

The sunshades are manufactured from a suitable material, e.g. from thin sheet metal, plastic, cardboard. The inside of the sunshades preferably has dark and matte surface finish, to rule out reflecting of the light in the lens.

FIG. 6 to FIG. 9 depicts an example of the accessory using a frame 34 having alternative design, that is more compact and lighter compared to the first example. The frame is manufactured from a suitable plastic material or metal using suitable technology, e.g. cast, moulded, stamped or 3D printed. The frame could be manufactured having two or more layers joined together using a suitable method (e.g. glued). Different layers could be made of either the same material or different materials (e.g. one layer of plastic, another layer of metal, etc.).

According to both examples the filter holder ring 9 can be assembled of two halves, a U-shaped half 13 and another half 14, forming a groove 10 when joined. When assembling the accessory the U-shaped half is joined to the other half 14 using a suitable method, e.g. with screws, bolts, pins, spigots, or using another known method, e.g. with glue.

Although according to the preferred embodiment the accessory is attached to the lens using a lens ring, the filter holding element and the filter holder-sunshade as a whole could be attached to a common frame with the camera, i.e. to a base rail formed of parallel tubes, generally used for cameras.

The invention claimed is:

1. A camera accessory comprising
a frame having an opening for the lens,
a filter holder attached to the frame, and
at least one sunshade attached to the frame, wherein the filter holder is rotatably attached into the opening in the frame, and the filter holder comprises a filter holder ring with outer diameter matching the diameter of the opening in the frame, and the filter holder ring has an opening of a diameter sufficiently larger than the lens diameter to prevent the ring being visible in the picture frame when the accessory is in use, wherein the filter holder has a filter slot for receiving a filter, said filter slot attached to the ring on one side of the frame, and a lens ring attachment element adapted to be removably attached to a lens ring on the side pointed towards the lens position, so that when the accessory is attached to said camera, the filter holder is rotatable around the longitudinal axis of the lens while the frame is independently rotatable in respect of said filter holder, so that said frame with attached sunshade and said filter holder can be rotated into any position in respect of each other, and in respect of lens wherein the accessory comprises an upper sunshade attached to the frame with a first clamped hinge, and at least one lateral sunshade attached to the frame with a second clamped hinge, whereas the first and second clamped hinges are integrated with each other to enable simultaneous adjusting of the positions of both the upper and lateral sunshades.

2. The accessory according to claim 1, wherein the filter holder ring is formed of two halves placed on different sides of the frame, which are joined together using attachment elements during the assembly of the filter holder-sunshade.

3. The accessory according to claim 1, wherein the lens ring attachment element comprises a pocket attached to the filter holder ring, comprising a flange with its one edge following the edge of the filter holder ring opening, and its other edge attached to the filter holder ring, and the first edge projects towards the edge of the filter holder ring opening, leaving a gap approximately equal to the thickness of the lens ring between the flange and the filter holder, whereas the flange extends around the ring opening by 120 to 200 degrees.

4. The accessory according to claim 3 wherein the filter holder ring is equipped with stop elements for fixing the position of the lens ring in the pocket.

5. The accessory according to claim 4, wherein the stop element is a section projecting towards the lens from the filter holder ring, and the filter holder ring is made of a sufficiently strong and flexible material so when the lens ring is pressed against the stop element the stop element bends away from the lens ring, and returns to its original position when the pressure is removed, to fix the position of the lens ring in the pocket.

6. The accessory according to claim 3, wherein the filter holder is equipped with a fixing element to prevent the filter holder from turning in relation to the frame.

7. The accessory according to claim 5, wherein the fixing element is a retaining element comprising an eccentric attached to the opening in the frame, and pressed against the filter holder ring.

8. The accessory according to claim 6, wherein the fixing element is formed of a slit in the frame and a screw decreasing the width of the slit when tightened, and thereby decreasing the diameter of the opening or deforming its shape, and increasing the width of the slit when loosened, and thereby increasing the diameter of the opening or restoring its round shape.

9. The accessory according to claim 1, wherein the first clamped hinge is formed by an edging crosswise to the frame, located at the top edge of the frame, and having a threaded opening, and an attachment bolt screwed in the threaded opening, and by an attachment lug of the upper sunshade having an opening for the attachment bolt; and the second clamped hinge is formed by a rod attached to the edge of the lateral sunshade enclosed in a bent attachment sheath with both ends brought together and equipped with an opening for the attachment bolt, whereas tightening of the attachment bolt clamps the attachment lug of the upper sunshade and the attachment sheath of the lateral sunshade together between the edging and the head of the bolt, thereby preventing the upper sunshade and the lateral sunshade from moving either by friction force or by fixing in pre-determined discrete positions.

10. The accessory according to claim 3, wherein the flange extends around the ring opening by approximately 180 degrees.

\* \* \* \* \*